United States Patent [19]

Helmeke et al.

[11] Patent Number: 5,869,593
[45] Date of Patent: Feb. 9, 1999

[54] HIGH MOISTURE VAPOR TRANSMISSION HOT MELT MOISTURE CURE POLYURETHANE ADHESIVE

[75] Inventors: Marietta B. Helmeke, Little Canada; John M. Zimmel, St. Paul, both of Minn.; Franz Maitz, Bruckmuhl, Germany

[73] Assignee: H. B. Fuller Licensing & Financing, Inc., St. Paul, Minn.

[21] Appl. No.: 67,160

[22] Filed: Apr. 27, 1998

Related U.S. Application Data

[63] Continuation-in-part of Ser. No. 878,260, Jun. 18, 1997, abandoned, and Ser. No. 906,807, Jun. 30, 1992, Pat. No. 5,508,371.

[30] Foreign Application Priority Data

Jul. 1, 1991 [DE] Germany ............... 41 21 716.0

[51] Int. Cl.$^6$ ..................................... C08G 18/30
[52] U.S. Cl. ............... 528/83; 428/334; 428/335; 428/336; 428/423.1; 528/59; 528/76; 528/80; 528/905
[58] Field of Search ................. 528/59, 76, 80, 528/83, 905; 428/334, 335, 336, 423.1

[56] References Cited

U.S. PATENT DOCUMENTS

| 3,645,925 | 2/1972 | Speranza et al. |
|---|---|---|
| 4,194,041 | 3/1980 | Gore et al. |
| 4,532,316 | 7/1985 | Henn . |
| 4,594,286 | 6/1986 | McKinney et al. |
| 4,758,648 | 7/1988 | Rizk et al. |
| 4,775,719 | 10/1988 | Markevka et al. |
| 4,780,520 | 10/1988 | Rizk et al. |
| 4,808,255 | 2/1989 | Markevka et al. |
| 4,820,368 | 4/1989 | Markevka et al. |
| 4,925,732 | 5/1990 | Driskill et al. |
| 5,130,404 | 7/1992 | Freeland . |
| 5,166,302 | 11/1992 | Werner et al. |
| 5,173,538 | 12/1992 | Glich et al. |
| 5,189,073 | 2/1993 | Humbert et al. |
| 5,441,808 | 8/1995 | Anderson et al. |
| 5,508,371 | 4/1996 | Werenicz et al. |
| 5,550,191 | 8/1996 | Hung et al. |
| 5,560,974 | 10/1996 | Langley . |

FOREIGN PATENT DOCUMENTS

| 0 455 400 A2 | 11/1991 | European Pat. Off. |
|---|---|---|
| 0 492 824 A2 | 7/1992 | European Pat. Off. |
| 0 668 302 A1 | 9/1995 | European Pat. Off. |
| 4121703 | 7/1991 | Germany . |
| 5 117 619 | 10/1991 | Japan . |

*Primary Examiner*—John M. Cooney, Jr.
*Attorney, Agent, or Firm*—Nancy N. Quan; Lisa L. Ryan

[57] ABSTRACT

This invention relates to a hot melt moisture cure polyurethane composition which is the reaction product of a) a polyether polyol formed from a compound selected from the group consisting of ethylene oxide, propylene oxide, 1,2-butylene oxide, 1,4-butylene oxide and mixtures thereof; b) a crystalline polyester polyol having a melting point from about 40° C. to about 120° C.; and c) and at least one polyfunctional isocyanate component.

27 Claims, No Drawings

HIGH MOISTURE VAPOR TRANSMISSION HOT MELT MOISTURE CURE POLYURETHANE ADHESIVE

REFERENCES TO RELATED APPLICATIONS

This is a continuation-in-part of U.S. patent application Ser. No. 08/878,260 filed Jun. 18, 1997 which is now abandoned and of Ser. No. 07/906,807 filed Jun. 30, 1992 now issued as U.S. Pat. No. 5,508,371 claiming a priority date of Jul. 1, 1991 from German Utility Patent Application Number P 41 21 716.0-43.

FIELD OF THE INVENTION

This invention relates to hot melt moisture cure polyurethane compositions comprising the reaction product of a polyether glycol, a crystalline polyester diol and at least one polyfunctional isocyanate component having two or more —NCO groups. The compositions can further optionally comprise a thermoplastic component. The compositions are useful as adhesives and coatings, and are particularly useful where high moisture vapor transmission rates are desired.

BACKGROUND OF THE INVENTION

Materials that are permeable to water only in vapor form have been produced for a considerable time. These materials do not allow the passage of water in liquid form. This material is extremely useful where it is desired to keep underlying articles or skin dry while allowing air and water vapor to travel through the material. These materials are useful for athletic clothing, medical garments, rain gear, tarpaulins, tents and other waterproof garments.

It is often desirable to fasten these materials to other substrates. Polyurethanes are commonly used as adhesives or coatings on such material. It is therefore necessary that the polyurethane composition also have a high moisture vapor transmission rate.

U.S. Pat. No. 4,194,041 to Gore et al. issued Mar. 18, 1980 teaches a layered article that prevents liquid water from penetrating through while at the same time permitting moisture vapor to pass out through the article. Gore teaches a hydrophilic layer which is a liquid polyether-polyurethane. The liquid polyurethane involves the mixing of two or more liquids, which are generally of low molecular weight. The initial physical properties of the system are poor until the curing proceeds to some degree. Such characteristics include green strength and low flow characteristics. Green strength refers to the strength of the bond after the composition sets, but before the composition is cured. Generally, these polyurethane adhesives have value where the initial strength of the bond is unimportant. Substantial bonding often forms over a period of time between hours and days and the resultant bond has high tensile strength and is strong and resilient to external forces.

U.S. Pat. No. 4,925,732 to Driskill et al. teaches a laminate which comprises a solvent based moisture permeable adhesive. This adhesive is the reaction product of a polyol of primarily oxyethylene units, a chain extender having a molecular weight in a range lower than about 500 and a polyisocyanate. These adhesives are undesirable because of the problems typically associated with the use of a solvent.

U.S. Pat. No. 4,532,316 to Henn issued Jul. 30, 1985 teaches how to make and use a hot melt moisture cure polyurethane prepolymer with high moisture vapor transmission rates which in elastomeric film form may be used in combination with other materials useful in rain protective garments. Henn uses a polyol, a polyisocyanate and a chain extender having a molecular weight in a range lower than about 500 used to build molecular weight faster, and therefore increase the green strength. Henn exemplifies the use of a poly(oxyethylene) glycol. There are disadvantages to the use of chain extenders including lower melt rates caused by the use of the chain extender, poor green strength and longer open times which consequently results in a surface which remains tacky longer. For coating applications, production will be slowed down, or it may be necessary to transfer coat which involves more steps. The transfer coating process also prevents the polyurethane composition from having an exposed surface during manufacturing which could result in the polyurethane undesirably adhering to equipment, or to other surfaces. Another problem associated with the use of chain extenders is stability during storage and during use at typical application temperatures from about 90° C. to about 110° C. Gelling is usually an indication of instability and can result when too much crosslinking takes place, ultimately destroying the processability and applicability of the prepolymer. In Example 1 at column 21 lines 29–32, Henn refers to a storage stability of 4 months, and in Example 3 at column 25 lines 29–31, Henn refers to the packaged prepolymer as remaining workable for at least several days. While this hot melt moisture cure is an improvement over the use of liquid moisture cure polyurethanes, the rate of set and green strength are still undesirably slow.

U.S. Pat. No. 5,508,371 to Werenicz et al. issued Apr. 16, 1996 teaches a polyurethane composition with superior moisture vapor transmission. Werenicz et al. teaches the use of a polyester polyol segmented with a polyether. Specifically, polyester polyols built up from aliphatic and aromatic dicarboxylic acids and diols having a chain length of between $C_2$ to $C_{20}$. The OH number of the polyester group lies between 10 and 50, and preferably between 10 and 40.

U.S. Pat. No. 5,166,302 to Werner et al. teaches a moisture curing polyurethane hot melt adhesive which utilize crystalline polyester polyols which have short setting times. However, Werner et al. does not teach nor suggest how to combine specific crystalline polyester polyols with specific polyether polyols to obtain rapid setting hot melt moisture cure compositions which have high moisture vapor transmission rates. In fact, Werner et al. teaches moisture-crosslinking hot melt adhesives which are highly resistant to the creepage of moisture as found at column 1 lines 64 to 68 and column 2 lines 1 to 2.

The present inventors have found a unique combination of polyols and isocyanates which results in prepolymers that have low viscosity, excellent thermal stability and a rapid set time as well as excellent green strength without the use of a chain extender. Green strength refers to the strength of a bond after the composition sets, but before the composition is cured. Once cured, these one-part hot melt moisture cure polyurethane compositions have surprisingly high green strength, very good flexibility, excellent mechanical strength and an excellent moisture vapor transmission rate.

SUMMARY OF THE INVENTION

This invention relates to a reactive hot melt moisture cure polyurethane composition which has a set time of less than about 10 seconds and a moisture vapor transmission rate of greater than about 500 grams/m²/day at a film thickness of greater than about 0.5 mils.

This invention further relates to a hot melt moisture cure polyurethane which is the reaction product of a) at least one polyether polyol formed from one or more ingredients selected from the group including ethylene oxide, propylene oxide, 1,2-butylene oxide, 1,4-butylene oxide and mixtures thereof; b) at least one crystalline polyester polyol having a melting point from about 40° C. to about 120° C.; and c) at least one polyfunctional isocyanate component. The polyfunctional isocyanate preferably has about two or more NCO groups. The crystalline polyester polyol is preferably free of ether linkages.

The hot melt moisture cure polyurethane composition may further comprise a thermoplastic component to impart improved film forming characteristics. It is not necessary to the compositions of the present invention that a thermoplastic component be added to form a film. However, the present inventors have found that by adding the thermoplastic component, better films are formed.

The resultant compositions can be designed to have short set times, superior green strength, low viscosities and excellent viscosity stability in the molten state, and once cured also have good flexibility, excellent mechanical strength and excellent moisture vapor transmission rates.

The excellent moisture vapor transmission rates make them especially useful for adhering to, and for coating woven and nonwoven material for use in medical garments, athletic gear, rain protective garments and tarpaulins to mention only a few waterproof garments where breathability is desired.

This invention further relates to a flexible laminate which comprises a) at least one flexible layer; and b) at least one hydrophilic hot melt moisture cure polyurethane layer wherein the hot melt moisture cure polyurethane composition is the reaction product of i) a polyether polyol formed from a compound selected from the group consisting of ethylene oxide, propylene oxide, 1,2-butylene oxide, 1,4-butylene oxide and mixtures thereof; ii) a crystalline polyester polyol having a melt point from about 40° C. to about 120° C.; and iii) at least one polyfunctional isocyanate component.

Surprisingly, these compositions have a faster rate of set when compared to compositions with comparable molecular weights using the polyol/chain extender of the prior art, thus resulting in lower tack initially. This allows for faster production rates when coating materials, and it is not necessary to transfer coat which may result in cost savings. More surprisingly, when the moisture cures of the present invention cool to room temperature, they have superior strength as compared to the polyol/chain extender combination of the prior art at comparable molecular weights. Once cured, these one-part hot melt moisture cure polyurethane compositions have surprisingly high green strength, very good flexibility, excellent mechanical strength and an excellent moisture vapor transmission rate.

DETAILED DESCRIPTION OF THE PREFERRED EMBODIMENTS

The hot melt moisture cure polyurethane compositions of the present invention will preferably have a short set time but this does not have to be the case. For most applications where these high moisture vapor transmission rates are appropriate, a short rate of set is preferred. However, not all applications require a fast rate of set. The rate of set is preferably less than about 20 seconds as measured by the time in which it takes to form a tack-free film and more preferably less than about 10 seconds. A tack-free film is defined as one which is not tacky to the touch. These compositions also have moisture vapor transmission rates of greater than about 500 grams/meter$^2$/day at a film thickness of greater than about 0.5 mils.

The polyether polyols useful herein include those compounds which are homopolymers or copolymers which are formed from one or more ingredients including ethylene oxide, propylene oxide, 1,2-butylene oxide, 1,4-butylene oxide and mixtures thereof. These polyols may have a random or a block configuration. Some useful polyether glycols include those which are the reaction product of propylene oxide or butylene oxide capped or copolymerized with ethylene oxide. The polyether glycol may be the reaction product of propylene oxide copolymerized with ethylene oxide and the mole % of ethylene oxide may be 0 to 100 mole %, preferably greater than about 15 mole % and most preferably greater than about 30 mole %. When the polyether glycol is the reaction product of butylene oxide copolymerized with ethylene oxide, the mole % of ethylene oxide may be about 30 to about 90 mole %, preferably about 40 to about 90 mole % and most preferably about 50 to about 90 mole %. The number average molecular weight of the resultant polyether polyol is from about 1000 to about 4000 grams per mole and preferably from about 2000 to about 4000 grams per mole.

These compositions are available from various corporations including Union Carbide under the tradename of Carbowax®. One example of a polyethylene glycol useful to the present invention is Carbowax® PEG 3350 which has a molecular weight of approximately 3000 g/mole.

The higher the ethylene oxide content of the polyether polyol and/or the polyurethane composition, the more hydrophilic the composition and the higher the moisture vapor transmission rate. A polyol which is 100% ethylene oxide having a high molecular weight may, however, result in a rigid composition which does not have good flexibility. If more flexibility is needed, a polyol having at least about 5% polypropylene oxide or butylene oxide should be used. Comonomers are preferable in the present invention.

Polyols having number average molecular weights of less than about 1000 grams/mole have been found to be less stable in the molten state. Furthermore, compositions utilizing polyols having molecular weights of greater than about 1000 grams per mole and preferably greater than about 2000 grams per mole have been found to have higher moisture vapor transmission rates. Higher molecular weight polyols also lower the amount of isocyanate required thus lowering the amount of urethane linkages, which may also increase moisture vapor transmission rates.

These polyols are supplied by such manufacturers as Arco Chemical Co. in Newtown Square, Pa., Huntsman Corp. in Houston, Tex., Texaco Chemical Co. in Bellaire, Tex., ICI Polyurethanes Group in West Deptford, N.J., BASF Corp. in Charlotte, N.C., Olin Corp. in Stamford, Conn., Union Carbide in Danbury, Conn., Mazer Chemicals in Gurnee, Ill., Ashland Chemical Co., Drew Division in Boonton, N.J., Dow Chemical Co. in Midland, Mich., Witco Corp. in Houston, Tex., and Bayer Corp. in Akron, Ohio.

Those crystalline polyester polyols useful herein are those polyols having a melt point from about 40° C. to about 120° C. and glass transition temperatures, $T_g$'s, of less than about 0° C. Preferably, the crystalline polyester polyols are those which are the reaction product of either hexane diol or butane diol, and an acid which may include adipic acid, dodecanedioic acid, sebacic acid, terephthalic acid and mixtures thereof. Examples of useful polyester polyols include Dynacoll® 7380 and Dynacoll® 7381 which are commercially available crystalline polyester polyols available from Huls America, Inc. in Piscataway, N.J. Furthermore, these crystalline polyester polyols are preferably free of ether linkages which may decrease the crystallinity of the polyester polyols. Those polyols having a melt point of less than about 40° C. have been found to result in compositions which set too slow while the polyols having a melt point of greater than about 120° C., on the other hand, require high temperatures of application, which may be detrimental to fabrics which are heat sensitive and which may melt or deform as a result of the high temperatures. Both types of polyols, however, can be used in combination with those polyols which do have the right melting point range. For the finished hot melt moisture polyurethane compositions having a set time of less than about 20 seconds, the crystalline polyester polyol is useful from about 20% to about 50% by weight of the composition, preferably from about 20% to about 40% by weight and most preferably from about 20% to about 30% by weight of the composition. Preferably, the hot melt moisture cure polyurethane composition will have a rate of set of less than about 10 seconds. The higher the percentage of crystalline polyester polyol, the faster the finished composition will set. However, this is balanced against the decrease in the moisture vapor transmission rate as the amount of the crystalline polyester polyol is increased.

The isocyanates useful herein include those described in U.S. Pat. Nos. 4,775,719 issued Oct. 4, 1988, U.S. Pat. No. 4,808,255 issued Feb. 28, 1989 and U.S. Pat. No. 4,820,368 issued Apr. 11 to Markevka et al. incorporated herein by reference. An example of a useful isocyanate compound is Isonate® 2125M, pure diphenylmethane diisocyanate (MDI) manufactured by Dow Chemical Co. in Midland, Mich. These isocyanate compounds are polyfunctional, having two or more —NCO groups, and include those isocyanates that are aliphatic and aromatic in nature. The isocyanate compounds can also comprise mixtures of aromatic and aliphatic isocyanates and isocyanates having both aliphatic and aromatic character. The isocyanate compounds can also contain other substituents which do not substantially adversely affect the properties of the isocyanate compounds such as viscosity of the isocyanate terminated prepolymers, the adhesive properties of the bond line or the reactivity of the —NCO groups during the formation of the prepolymer. Typical aromatic isocyanates include diphenylmethane diisocyanate compounds (MDI) including its isomers, carbodiimide modified MDI, diphenylmethane 4,4'-diisocyanate, diphenylmethane-2,2'-diisocyanate, diphenylmethane-2,4'-diisocyanate, and other oligomeric methylene isocyanates; toluene diisocyanate compounds (TDI) including isomers thereof; tetramethylxylene diisocyanate (TMXDI), isomers of naphthalene diisocyanate, isomers of triphenylmethane triisocyanate, and mixtures thereof. Aliphatic di-, tri- and polyisocyanates are also useful including, for example, isophorone diisocyanate, hydrogenated aromatic diisocyanates, aliphatic polyisocyanates and cycloaliphatic polyisocyanates to mention only a few.

These compositions may optionally comprise other polyols which may be utilized in combination with the polyether polyols and the crystalline polyester polyols. Examples of other useful polyols include amorphous polyester polyols and high viscosity liquid polyester polyols. The amount of crystallinity for a given polyol may be measured by its glass transition temperature of $T_g$. The more amorphous is the polyester polyol, the higher the $T_g$. These amorphous copolyesters have $T_g$'s ranging from about 0° C. to about 50° C. In contrast, the crystalline polyester polyols useful herein, have $T_g$'s of less than about 0° C. An example of a useful amorphous polyester polyol is Dynacoll® 7130, an amorphous copolyester having a $T_g$ of about 30° C. The high viscosity liquid polyester polyols are those having a viscosity of greater than about 10,000 mPa-sec at about 80° C. An example of a useful high viscosity liquid polyester polyol is Dynacoll® 7210 having a viscosity of about 15,000 mPa-sec at a temperature of about 80° C. These polyols are useful up to about 50% by weight of the composition, preferably up to about 30% by weight and most preferably up to about 20% by weight of the composition.

A catalyst may optionally be utilized in the compositions of the present invention to improve curing speed without adversely affecting other physical properties such as green strength or thermal stability. Preferred catalysts comprise both ether and morpholine functional groups, with 2,2-dimorpholinoethyl ether and di(2,6-dimethyl morpholinoethyl)ether being the most preferred. An example of a useful catalyst is 4,4'-(oxydi-2,1-ethanediyl) bis-morpholine. This catalyst is otherwise known as DMDEE and is available under the tradename of Jeffcat DMDEE from Huntsman Corp. located in Houston, Tex. Other catalysts such as ethylene diamine and organo tin and bismuth catalysts such as dibutyl tin dilaurate and dibutyl tin diacetate are not as advantageous. In general, bismuth octoate, for instance, is a very good hot melt moisture cure catalyst, but is less stable during shipping and storage where the temperatures may reach about 65° C. Other catalysts include aliphatic titanates having from 1–12 carbon atoms such as lower alkyl titanates including tetrabutyl titanate and tetraethyl titanate, and amines. These catalysts are useful from about 0.01% to about 2% by weight in the one-part hot melt moisture cure polyurethane composition.

The hot melt moisture cure polyurethane compositions of the present invention may optionally comprise a thermoplastic component. Preferred thermoplastic components include Pearlstick® thermoplastic polyurethane polymers from Aries Technologies in Derry, N.H., a distributor of Merquinsa located in Barcelona, Spain; Hytrel® 8171, a butylene/poly(alkylene ether) phthalate from DuPont de Nemours in Wilmington, Del.; ethylene vinyl acetate copolymers also available from Du Pont de Nemours under the tradename of Elvax® and from Quantum Chemical Co., USI Division in Cincinnati, Ohio under the tradename of Ultrathene®; ethylene n-butyl acrylate copolymers available from Quantum Chemical Co., USI Division in Cincinnati, Ohio under the tradename of Enathene®, from Exxon Chemical Co. in Houston, Tex. under the tradename of Escorene® and from Elf Atochem North America in Philadelphia, Pa. under the tradename of Lotryl®; ethylene methyl acrylate available from Exxon under the tradename of Optema®; ethylene acrylate copolymers from Du Pont under the tradename of Elvaloy®; ethylene n-butyl acrylate carbon monoxide terpolymers available from Du Pont also under the tradename of Elvaloy® and acrylic polymers such as those supplied by ICI Acrylics located in St. Louis, Mo. under the tradename of Elvacite®. The present inventors contemplate the use of any thermoplastic polymers which would be compatible in the one-part hot melt moisture cure polyurethane compositions of the present invention. The critical requirement is that the copolymer selected be compatible with the polyols selected. This aspect of the invention is fully discussed in the patents previously incorporated herein by reference which are U.S. Pat. Nos. 4,775,719, 4,808,255 and 4,820,368 to Markevka et al. and U.S. Pat. No. 5,411,808 to Anderson et al. issued Aug. 15,1995. These thermoplastic polymers may be present from about 5% to about 50% by weight of the composition, preferably from about 5% to about 40% by weight of the composition, more preferably from about 5% to about 30% by weight of the composition and most preferably from about 5% to about 20% by weight of the composition.

The compositions of the present invention may optionally contain other ingredients. To improve the tack and to impart pressure sensitive qualities a tackifying resin may be incorporated. Tackifying resins should be selected based on compatibility with the composition. Also, those tackifiers having residual acid numbers such as rosin based tackifying resins and those resins having phenolic functionality are selected with care as the residual acid may react in the hot melt moisture cure system. One of skill in the hot melt adhesive art would recognize that there are numerous tackifying resins that may be utilized and the list is not exclusive.

Plasticizers may also be incorporated into the system. The plasticizers are carefully selected so as not to interfere with the efficacy of the other components, but will facilitate processing and increase flexibility of the composition.

Representative plasticizers and tackifying resins may also be found in U.S. Pat. Nos. 4,775,719, 4,808,255 and 4,820,368 to Markevka et al. and U.S. Pat. No. 5,441,808 to Anderson et al. herein incorporated by reference.

The compositions of the present invention may optionally contain fillers. Such fillers may include talcs, clays, silicas and treated versions thereof, carbon blacks and micas. Examples of such fillers include Mistron Vapor® talc from Luzenac America, Inc. in Englewood, Colo.; Nytal® 200, 300 and 400, different particle size grades of talc from R.T. Vanderbilt Co. in Norwalk, Conn.; Snobrite® Clay, a Kaolin clay available from Evans Clay Co. in Mcintyre, Ga.; Cab-o-sil® TD-720, a fumed silica available from Cabot Corp. in Tuscol, Ill. and Mineralite® 3× and 4× micas available from Mineral Mining Corp. in Kershaw, S.C.

A stabilizer or antioxidant can also be added to protect the composition from degradation caused by reaction with oxygen induced by such things as heat, light or residual catalyst from the raw materials such as the tackifying resin. Such antioxidants are commercially available from Ciba-Geigy in Hawthorne, N.Y. and include Irganox® 565, 1010 and 1076, all hindered phenolic antioxidants, and Anox® 20, also a hindered phenolic antioxidant from Great Lakes Chemicals in West Lafayette, Indiana. These are primary antioxidants which act as free radical scavengers and may be used alone or in combination with other antioxidants such as phosphite antioxidants like Irgafos® 168 available from Ciba-Geigy. Phosphite antioxidants are considered secondary antioxidants, are primarily used as peroxide decomposers and are generally not used alone, but are instead used in combination with other antioxidants. Other available antioxidants are Cyanox® LTDP, a thioether antioxidant available from Cytec Industries in Stamford, Conn., Ethanox® 330, a hindered phenolic antioxidant, available from Albemarle in Baton Rouge, La. Many other antioxidants are available for use by themselves, or in combination with other antioxidants. These compounds are added to the hot melt moisture cure polyurethane composition in small amounts of up to about 2% by weight in the composition, and have no effect on the physical properties of the composition.

There are various other ingredients that can be added to such compositions including ultraviolet (UV) scavengers or absorbers, pigments to add color, fluorescing agents, odor masks, adhesion promoters (i.e. silane), surfactants, defoamers and so forth. Typically, these ingredients are added in small amounts of typically less than about 5% by weight of the composition and more typically less than about 2% by weight.

While the choice of component, order of addition and addition rate can be left to one of skill in the art, generally the reactive hot melt polyurethane compositions of this invention can be made by reacting the isocyanate and the polyols and then blending with the thermoplastic component and any other optional ingredient that may be added. The amount of each ingredient is based on a percentage of the resultant total weight of the hot melt moisture cure composition regardless of what the ingredients are. Optionally, the thermoplastic component can be blended with the polyols before reacting with the isocyanate.

The compositions are typically prepared by reacting the polyols, in this case at least one polyether polyol and at least one crystalline polyester polyol with at least one polyfunctional isocyanate compound at an elevated temperature of typically between about 40° C. and about 200° C. The polyols may first be introduced into a reaction vessel, heated to reaction temperatures and dried to remove ambient moisture absorbed by the polyols. The polyfunctional isocyanate compounds are then added to the reactor. The polyols are generally reacted with the isocyanate compounds at ratios that typically depend on the hydroxy and isocyanate functionality of the reactants. Typically the compounds are reacted at ratios which result in a reaction between isocyanate groups and hydroxy groups leaving essentially no residual hydroxy and minimal isocyanate functionality, typically less than 10% by weight of the prepolymer. Typically the reaction between the polyol compounds and the isocyanate compounds is conducted at an OH:NCO ratio of between about 0.75:1.0 and 0.15:1.0 in order to obtain an NCO concentration in the final adhesive of about 1% to about 5% by weight. Typically the prepolymer is titrated to measure residual concentration of isocyanate using ASTM D-2572-80 "Standard Method for Isocyanate Group and Urethane Materials or Prepolymers" to determine completion of the reaction. The resultant compositions can then be packaged in suitable moisture proof containers.

The reactive hot melt urethane compositions can be cured after application using a variety of mechanisms. The curing reaction occurs between a compound having an available active hydrogen atom and the NCO groups of the polyurethane prepolymer. A variety of reactive compounds having free active hydrogens are known in the art including water, hydrogen sulfide, polyols, ammonia and other active compounds. These curing reactions may be carried out by relying on ambient moisture, or the active compounds may be added to the composition at the bond line. When the compositions react with water, urea groups are formed to provide a polyurethane urea polymer.

The resultant compositions are low in viscosity, having viscosities of less than about 40,000 cPs, preferably less than about 30,000 cPs and most preferably less than about 20,000 cPs at 110° C. These compositions generally have superior green strength which refers to the strength of the adhesive bond before the composition has cured. They also have a short set time and can form a tack-free film within 10 seconds. Once cured, they are very flexible and have good mechanical strength. The short set time makes them amenable to high speed converting operations because the coated material may be rolled or wound upon itself immediately prior to curing.

The resultant compositions also have excellent moisture vapor transmission rates (MVTR) of greater than about 500 grams per meter squared per day at a film thickness of about 0.5 mils as measured by ASTM E 96 B. It is also possible to measure this aspect of the invention using a permeability coefficient as measured by ASTM F 1249-90. It is obvious to one of skill in the art that if the film thickness is decreased, the moisture vapor transmission rates will increase, and if the film thickness is increased, the moisture vapor transmission rates will decrease. These compositions are also hydrophilic. In this instance, hydrophilicity refers to the transfer of substantial amounts of water through a film by absorbing water on one side of the film where the water vapor concentration is high, and desorbing or evaporating it on the opposite side of the film where the water vapor concentration is low. These materials do not readily allow the passage of other materials such as surface active agents and contaminants found in perspiration and other organic materials generally and also water in liquid form. This characteristic makes them ideal for adhesives and coatings which are used on flexible materials including woven and non-woven materials which are used for protective rain gear, athletic gear, medical garments, tarpaulins and tents to mention only a few waterproof garments where breathability is desired. Breathability is a term which also may be used to describe the permeability to water in vapor form, and transport of water by diffusion.

The compositions of the present invention may be used as either coatings, or as adhesives where two substrates are sealed together by applying either a continuous or an interrupted pattern of the composition to a first substrate, contacting the composition with a second substrate and allowing the composition to cure.

The compositions of the present invention may therefore be laminated to flexible layers including waterproof materials such as polytetrafluoroethylene, microporous polypropylene, woven and tightly spaced nonwoven polyethylene and polypropylene, and other types of materials which are treated with hydrophobic agents, to mention only a few. Hydrophobic means that water will not spread on the material and wick into its porous structure. Water vapor, on the other hand, which may evaporate or desorb from the hydrophilic layer, is free to flow or diffuse as a gas through the pores of the hydrophobic layer to the exterior environment. These flexible layers may further be laminated to other flexible layers including knitted or random laid materials such as fleeces. These materials may be nylon, polyester and nylon tricot knit for instance.

The present inventors also envision that these compositions may be applied to rigid substrates including those materials used in manufacturing shoes, as well as for applications in the building industry.

The compositions of the present invention are ideally suited for direct coating onto any materials without transfer coating due to a high green strength and rapid rate of set which means that tack is lost rapidly, although transfer coating is not precluded. Such coating methods may therefore include slot die coating, roll coating, gravure coating and transfer coating but this list is not exclusive. The application temperature may be varied between about 75° C. and about 125° C. The sensitivity of the substrate to high temperatures may determine which application temperature is applicable. Such physical characteristics as the viscosity and rate of set of the compositions may be varied to accommodate such application conditions. Specific applications that the present inventors contemplate that the compositions of the present invention may be used for include that found in U.S. Pat. No. 5,560,974 to Langley issued Oct. 1, 1996 in which a composition would be used as a spot or pattern adhesive on a breathable non-woven composite fabric bonded to a microporous film, a coating material as found in U.S. Pat. No. 5,508,371 issued Apr. 16, 1996 to Werenicz et al. and as a hydrophilic layer as found in U.S. Pat. No. 4,194,041 issued Mar. 18, 1980 to Gore et al. These are only a few specific examples and it should be recognized that these compositions are contemplated for use in any application where a high moisture vapor transmission coating or adhesive is required. These compositions are also contemplated for use where rigid materials are used.

The rapid loss of tack indicates that these compositions will not undesirably adhere to production equipment or other materials. Directly coating substrates allows for higher production speeds and lower cost because the amount of material used is decreased. These adhesives or coatings may be laminated either as a continuous film, or as an interrupted pattern.

In summary, these laminates therefore generally have one or more layers including any of the materials mentioned above, and another layer which may be an adhesive used between two layers referred to as adherents, or may be a coating on one layer. The compositions of the present invention are ideally suited for use as either adhesives or as coatings in this instance.

The following non-limiting examples further illustrate the invention.

EXAMPLES

Test Methods

1. Melt Viscosities

The melt viscosities of the hot melt adhesives were determined on a Brookfield Thermosel Viscometer Model DV-I using a number 27 spindle.

2. Moisture Vapor Transmission Rate (MVTR)

The MVTR was determined using ASTM E 96 B. Film thicknesses were varied between 0.625 mils and 1.25 mils. A DuPont resin was used as the standard of measurement.

3. Permeability Coefficient

The permeability coefficient was determined using ASTM F1249–90, "Standard Test Method for Water Vapor Transmission Rate Through Plastic Film and Sheeting Using a Modulated Infrared Sensor." The test was conducted at about 37° C. (100° F.) and 90% relative humidity. Film thicknesses were about 40 mils.

EXAMPLES

Polyol 1

Polyol 1 is a polyether polyol comprised of the reaction product of 70 mole % of polypropylene oxide capped with 30 mole % of polyethylene oxide. The resultant polyol has an OH number of about 55.

Polyol 2

Polyol 2 is a polyether polyol which is the reaction product of 50 mole % of polypropylene oxide capped with 50 mole % of polyethylene oxide. The resultant polyol has an OH number of about 55.

Polyol 3

Polyol 3 is a polyether polyol which is the reaction product of 70 mole % of polybutylene oxide capped with 30 mole % of polyethylene oxide. The resultant polyol has an OH number of about 55.

Polyol 4

Polyol 4 is a polyether polyol which is the reaction product of 50 mole % of polybutylene oxide capped with 50 mole % of polyethylene oxide. The resultant polyol has an OH number of about 55.

Polyol 5

Polyol 5 is a polyether polyol which is the reaction product of 25 mole % polybutylene oxide capped with 75 mole % of polyethylene oxide. The resultant polyol has a number average molecular weight of about 1050 grams per mole.

Polyol 6

Polyol 6 is a polyether polyol which is the reaction product of 25 mole % of polybutylene oxide capped with 75 mole % of polyethylene oxide. The resultant polyol has a number average molecular weight of about 2500 grams per mole.

EXAMPLES 1 TO 10

Example 1

A reactor was charged with about 248 grams of Polyol 1 and heating was started to 1000° C., at which time about 5 g of filler, Mistron Vapor® talc, was added. When the temperature was above about 75° C., the reactor was charged with about 173.5 grams of Dynacoll® 7380, a crystalline polyester polyol from Hüls America in Piscataway, N.J. The polyols were dried in the reactor at about 105° C. for 1 hour under a vacuum of at least 27 in Hg. The temperature of the blend was cooled to about 90° C. and the reactor was charged with 73.5 grams of Isonate® 2125M, a 1,1'-methylene bis(4-isocyanato) benzene, available from Dow Chemical Co. in Midland, Minn. The reaction was continued for 60 minutes at 100° C. under vacuum. A prepolymer having about 2% NCO was obtained.

Example 2

A reaction was carried out according to the procedure in Example 1 with about 248 grams of Polyol 2, about 5 grams of Mistron Vapor® talc, about 174 grams of Dynacoll® 7380 crystalline polyester polyol and about 73 grams of Isonate® 2125M. The reaction yielded a prepolymer having about 2% NCO.

Example 3

A reactor was vacuum charged with about 181 grams of Polyol 2 and heating was started to 100° C. At this time, about 36 grams of Pearlstick® 501, a thermoplastic polyurethane polymer from Aries Technologies in Derry, N.H. was added to the mixture. When the temperature reached above about 75° C., the reactor was then charged with about 127 grams of Dynacoll® 7381, a crystalline polyester polyol from Hüls America, Inc. in Piscataway, N.J. The polyols were dried in the reactor for 1 hour at a temperature of about 105° C. and a minimum vacuum of 27 in Hg. The temperature of the blend was cooled to less than about 90° C., about 56 grams of Isonate® 2125M, a polyfunctional isocyanate, was then added and reacted under the vacuum for 60 minutes. The temperature of the reaction was then maintained at less than about 100° C. The reaction yielded a prepolymer having about 2% NCO.

The resultant composition exhibited a moisture vapor transmission rate of about 580 grams/meter²/day at a film thickness of 0.625 mils as measured by method ASTM E 96 B.

Example 4

A reaction was carried out according to the procedure in Example 3 with about 173 grams of Polyol 2, about 69.5 grams of Pearlstick® 501 thermoplastic polyurethane, about 104 grams of Dynacoll® 7381 crystalline polyester polyol and about 53.5 grams of Isonate® 2125M, a polyfunctional isocyanate. This reaction yielded a prepolymer having about 2% NCO.

The resultant composition exhibited a moisture vapor transmission rate of about 580 grams/meter²/day at a film thickness of 0.625 mils as measured by method ASTM E 96 B.

Example 5

A reactor was charged with about 198.5 grams of Polyol 3, about 139 grams of Dynacoll® 7380, a crystalline polyester polyol, and about 4 grams of Mistron Vapor® talc filler. These components were melted and dried for 1 hour at about 105° C. under a minimum vacuum of 27 in Hg. The reactor was cooled to about 90° C., the vacuum was broken with nitrogen and about 58.5 grams of Isonate® 2125M, polyfunctional isocyanate compound, was added. The temperature was maintained at 100° C. for 1 hour under vacuum. The reaction produced a prepolymer having about 2% NCO.

Example 6

A reaction was carried out according to the procedure used for Example 5 using about 199 grams of Polyol 4, about 139 grams of Dynacoll® 7380 crystalline polyester polyol, about 4 grams of Mistron Vapor® talc and about 58 grams of Isonate® 2125M polyfunctional isocyanate compound. A prepolymer having about 2% NCO was obtained.

Example 7

A reaction was carried out, again according to the procedure used in Example 5, with 138 grams of hexanediol adipate with an OH number of 22,256 grams of Fomrez® PEG 1000L polyethylene glycol from Witco Corp. and 106 grams of Isonate® 2125M isocyanate compound. The reaction yielded a prepolymer with 2.5% NCO.

This example exhibited a permeability coefficient of 3.97 (grams×inch)/meter²×day.

Example 8

A reaction was carried out according to the procedure in Example 5 with 224 grams of hexanediol adipate with an OH number of 22,183 grams of Fomrez® PEG 1000L polyethylene glycol and 93 grams of Isonate® 2125M isocyanate compound. The reaction yielded a prepolymer with 2.5% NCO.

The permeability coefficient was 2.55 (grams×inch)/m²×day).

Examples 7 and 8 show that when the amount of crystalline polyol is increased, the moisture vapor transmission rate decreases as shown by the permeability coefficient.

Example 9

The procedure according to Example 5 was used to carry out a reaction with 76.5 grams of Dynacoll® 7381 crystalline polyester polyol, 304.5 grams of Fomrez® PEG 1000L polyethylene glycol and 119.0 grams of Isonate 2125M isocyanate compound. The reaction yielded a prepolymer with 2.5% NCO.

The permeability coefficient was 2.14 (grams×inch)/(m²×day).

Example 10

The procedure according to Example 5 was used to carry out a reaction with 136.5 grams of Dynacoll® 7331 crystalline polyester polyol, 254 grams of Fomrez® PEG 1000L polyethylene glycol and 109.5 grams of Isonate® 2125M isocyanate compound. The reaction yielded a prepolymer with 2.5% NCO.

The permeability coefficient was 5.55 (grams×inch)/(m²×day).

EXAMPLES 11 TO 14

The following examples illustrate that higher moisture vapor transmission rates can be achieved when those polyether polyols having a number average molecular weight from about 2000 grams/mole to about 4000 grams/mole are used.

Example 11

A reactor was charged with about 364.5 grams of Terathane® 1000, a polytetrahydrofuran polyether glycol with a number average molecular weight of about 1000 grams per mole available from Du Pont, and 135.5 grams of Isonate® 2125M and the procedure in Example 5 was followed. A prepolymer having 3.0% NCO was obtained which had a permeability coefficient of 2.06 (grams×inch)/(m²×day).

Example 12

A reactor was charged with about 426.5 grams of Terathane® 2900, a polytetrahydrofuran polyether glycol with a number average molecular weight of about 3000 grams per mole available from Du Pont, and 73.5 grams of Isonate® 2125M and the procedure in Example 5 was followed. A prepolymer with an NCO content of about 2.5% was obtained and the permeability coefficient was 3.32 (grams×inch)/(m²×day).

Example 13

A reactor was charged with about 368.5 grams of Polyol 5, a polyether polyol having a number average molecular weight of about 1050 grams per mole, and 131.5 grams of Isonate 2125M and the procedure in Example 5 was followed. A prepolymer having an NCO content of about 3.0% by weight and a permeability coefficient of about 1.43 (grams×inch)/(m²×day).

Example 14

A reactor was charged with about 421.5 grams of Polyol 6, a polyether polyol with a number average molecular weight of about 2500 grams per mole, and about 78.5 grams of Isonate® 2125M and the procedure according to Example 5 was followed. A prepolymer having an NCO content of about 2.5% by weight and a permeability coefficient of about 4.74 (grams×inch)/(m²×day) was obtained.

Example 15

A reaction was carried out by adding 75 g (37.5%-wt) of Dynacoll® 7130, an amorphous copolyester having a $T_g$ of greater than about 30° C.; 25g (12.5%-wt) of Dynacoll® 7210, a copolyester which is a liquid, having a high viscosity, at room temperature, of about 15,000 mPa-sec; and 23 g (11.5%-wt) of Dynacoll® 7381, a crystalline copolyester, and heating the mixture to 120° C. and together with 51 g (25.5%-wt) of a polyethylene glycol, a polyether glycol formed from ethylene oxide, having a molecular weight of 3000 g/mole (similar to Carbowax® PEG 3350 available from Union Carbide). These ingredients were evacuated for 45 minutes at this temperature. The vacuum was below 1 Torr. Then 25 g (12.5%-wt) of diphenylmethane-4,4'-diisocyanate (Desmodur® 44 MS) were added. Subsequently, 1 g (0.5%-wt) of Irganox® 1010, a hindered phenolic antioxidant available from Ciba-Geigy was added. This mixture then must be heated for 60 minutes at 120° C. to 130° C. and homogenized. The composition is then allowed to cool.

We claim:

1. A hot melt moisture cure polyurethane composition comprising the reaction product of:
   a) at least one polyether glycol formed from at least one compound selected from the group consisting of ethylene oxide, propylene oxide, 1,2-butylene oxide, 1,4-butylene oxide and mixtures thereof;
   b) at least one crystalline polyester polyol having a melting point of from about 40° C. to about 120° C.; and
   c) at least one polyfunctional isocyanate;
wherein the resultant one-part hot melt moisture cure polyurethane has a moisture vapor transmission rate of greater than about 500 grams per meter squared per day at a film thickness of greater than about 0.5 mils.

2. The composition of claim 1 wherein said crystalline polyester polyol is present from about 20% to about 50% by weight of the composition.

3. The composition of claim 2 wherein said composition has a set time of less than about 10 seconds.

4. The composition of claim 1 wherein said polyester polyol is free of ether linkages.

5. The composition of claim 1 wherein said polyether glycol is selected from the group consisting of a compound formed from ethylene oxide, the reaction product of propylene oxide copolymerized with greater than about 15 mole % of ethylene oxide, the reaction product of propylene oxide copolymerized with greater than about 30 mole % of ethylene oxide, the reaction product of butylene oxide copolymerized with greater than about 30 mole % of ethylene oxide, the reaction product of butylene oxide copolymerized with greater than about 50 mole % of ethylene oxide and mixtures thereof.

6. The composition of claim 1 wherein the polyether glycol has a number average molecular weight from about 2000 to about 4000 grams per mole.

7. The composition of claim 1 wherein said polyester polyol is the reaction product of at least one diol selected from the group consisting of hexane diol and butane diol, and at least one acid selected from the group consisting of adipic acid, dodecanedioic acid, sebacic acid and terephthalic acid.

8. The composition of claim 1 wherein said composition further comprises at least one polyester polyol selected from the group consisting of amorphous polyester polyols having a $T_g$ of greater than about 0° C., high viscosity liquid polyester polyols having a viscosity of greater than about 10,000 mPa-sec at 80° C. and mixtures thereof.

9. The composition of claim 8 wherein said composition comprises the reaction product of:
   a) at least one polyether glycol formed from ethylene oxide having a molecular weight of about 3000 g/mole;
   b) at least one crystalline polyester polyol having a melting point of from 40° C. to about 120° C.;
   c) at least one amorphous polyester polyol having a $T_g$ from about 20° C. to about 40° C.;
   d) at least one high viscosity liquid polyester polyol having a viscosity from about 10,000 mPa-sec to about 20,000 mPa-sec; and
   e) at least one polyfunctional isocyanate.

10. The composition of claim 9 wherein said polyfunctional isocyanate is diphenylmethane-4,4'-diisocyanate.

11. The composition of claim 9 wherein the rate of set is greater than about 20 seconds.

12. The composition of claim 1 wherein the polyurethane further comprises from about 5% to about 50% by weight of at least one thermoplastic component.

13. The composition of claim 12 wherein the thermoplastic component is selected from the group consisting of polyurethanes, ethylene vinyl acetate copolymers, ethylene n-butyl acrylate copolymers, ethylene methyl acrylate copolymers, ethylene acrylate copolymers, acrylic polymers, butylene/poly(alkylene ether) phthalate polymers and mixtures thereof.

14. Waterproof garments selected from the group consisting of protective rain gear, athletic gear, medical garments, tarpaulins and tents comprising the composition of claim 1 wherein said composition is utilized as an adhesive or as a coating on said garments.

15. A flexible laminate, comprising:
I. at least one flexible layer; and
II. at least one hydrophilic layer comprising a hot melt moisture cure polyurethane composition said composition comprising the reaction product of:
a) at least one polyether glycol formed from at least one compound selected from the group consisting of ethylene oxide, propylene oxide, 1,2-butylene oxide, 1,4-butylene oxide and mixtures thereof;
b) at least one crystalline polyester polyol having a melting point of from about 40° C. to about 120° C.; and
c) at least one polyfunctional isocyanate.

16. The flexible laminate of claim 15 wherein at least one flexible layer is hydrophobic and the hydrophilic hot melt moisture cure layer is continuous, and is attached to the inner face of said hydrophobic layer.

17. The flexible laminate of claim 15 wherein there are at least two flexible layers which are adherents, and the hydrophilic hot melt moisture cure layer is an adhesive.

18. The flexible laminate of claim 17 wherein at least one flexible layer is a nonwoven material.

19. Waterproof garments selected from the group consisting of protective rain gear, athletic gear, medical garments, tarpaulins and tents comprising the flexible laminate of claim 15 wherein said hydrophilic hot melt moisture cure polyurethane layer utilized as an adhesive or as a coating of said flexible laminate.

20. The flexible laminate of claim 15 wherein said hydrophilic hot melt moisture cure polyurethane layer has a moisture vapor transmission rate of greater than about 500 grams/meter$^2$/day at a film thickness of greater than about 0.5 mils.

21. The flexible laminate of claim 15 wherein said hydrophilic hot melt moisture cure polyurethane layer has a set time of less than about 10 seconds.

22. The flexible laminate of claim 15 wherein said polyester polyol is free of ether linkages.

23. The flexible laminate of claim 15 wherein said polyether glycol is selected from the group consisting of a compound formed from the reaction product of propylene oxide copolymerized with greater than about 15 mole % of ethylene oxide, the reaction product of propylene oxide copolymerized with greater than about 30 mole % of ethylene oxide, the reaction product of butylene oxide copolymerized with greater than about 30 mole % of ethylene oxide, the reaction product of butylene oxide copolymerized with greater than about 50 mole % of ethylene oxide and mixtures thereof.

24. The flexible laminate of claim 15 wherein said polyether glycol has a number average molecular weight from about 2000 to about 4000 grams per mole.

25. The flexible laminate of claim 15 wherein said polyester polyol is the reaction product of a diol selected from the group consisting of hexane diol and butane diol, and an acid selected from the group consisting of adipic acid, dodecanedioic acid, sebacic acid, terephthalic acid and mixtures thereof.

26. The flexible laminate of claim 15 wherein said hydrophilic hot melt moisture cure polyurethane layer further comprises from about 5% to about 50% by weight of a thermoplastic component.

27. The flexible laminate of claim 26 wherein said thermoplastic component is selected from the group consisting of thermoplastic polyurethanes, ethylene vinyl acetate copolymers, ethylene n-butyl acrylate copolymers, ethylene methyl acrylate copolymers, ethylene acrylate copolymers, acrylic polymers and butylene-poly(alkylene ether) phthalate polymers.

* * * * *